US010591287B2

(12) United States Patent
Kang

(10) Patent No.: US 10,591,287 B2
(45) Date of Patent: Mar. 17, 2020

(54) APPARATUS AND METHOD FOR DETERMINING CONTENT SCREENING SUITABILITIES IN A MULTI-PROJECTION THEATER

(71) Applicant: CJ CGV CO., LTD., Seoul (KR)

(72) Inventor: Jihyung Kang, Hwaseong-si (KR)

(73) Assignee: CJ CGV CO., LTD., Seoul (KR)

( * ) Notice: Subject to any disclaimer, the term of this patent is extended or adjusted under 35 U.S.C. 154(b) by 1135 days.

(21) Appl. No.: 14/961,353

(22) Filed: Dec. 7, 2015

(65) Prior Publication Data

US 2016/0178361 A1    Jun. 23, 2016

(30) Foreign Application Priority Data

Dec. 19, 2014 (KR) .................. 10-2014-0184949

(51) Int. Cl.
| | |
|---|---|
| *G01B 21/02* | (2006.01) |
| *G03B 37/04* | (2006.01) |
| *H04N 9/31* | (2006.01) |
| *A63J 25/00* | (2009.01) |
| *E04H 3/22* | (2006.01) |

(52) U.S. Cl.
CPC .............. *G01B 21/02* (2013.01); *A63J 25/00* (2013.01); *G03B 37/04* (2013.01); *H04N 9/3147* (2013.01); *E04H 3/22* (2013.01); *G03B 2206/00* (2013.01)

(58) Field of Classification Search
CPC ........ G01B 21/02; G02B 37/04; G03B 37/04; G03B 2206/00; A63J 25/00; H04N 9/3147; E04H 3/22

USPC .................................. 702/155, 158, 166, 170
See application file for complete search history.

(56) References Cited

U.S. PATENT DOCUMENTS

| | | | |
|---|---|---|---|
| 5,963,247 A | 10/1999 | Banitt | |
| 6,034,717 A * | 3/2000 | Dentinger | G02B 27/0093 348/51 |

(Continued)

FOREIGN PATENT DOCUMENTS

| | | |
|---|---|---|
| CN | 1881070 A | 12/2006 |
| CN | 103765311 A | 4/2014 |

(Continued)

OTHER PUBLICATIONS

Chinese Office Action dated May 3, 2017 in connection with the counterpart Chinese Patent Application No. 2015109586751.

*Primary Examiner* — Stephanie E Bloss
(74) *Attorney, Agent, or Firm* — Hauptman Ham, LLP

(57) ABSTRACT

The present invention relates to a method of determining content screening suitabilities in a multi-projection theater including a plurality of projection planes. More particularly, the present invention relates to a method of determining content screening suitabilities based on a series of operation equations using content attribute values, such as the horizontal length and vertical length of an output screen when content is played back, and theater attribute values, such as the length and height of the surface of a front or side wall within a theater building. The method may include calculating at least one of a screen attribute value and a theater attribute value, calculating a suitability based on the screen attribute value or the theater attribute value, and determining whether the calculated suitability falls within a predetermined range.

13 Claims, 6 Drawing Sheets

(1) Theater width
(2) Theater height
(3) Theater depth
(4) Screen width
(5) Screen height
(6) Left bezel
(7) Right bezel
(8) Length from ceiling to top boundary of screen
(9) Length from bottom boundary of screen to bottom of theater
(10) Front depth of seat
(11) Rear depth of seat
(12) Rear height of seat

(56) References Cited

U.S. PATENT DOCUMENTS

| | | | | |
|---|---|---|---|---|
| 7,221,506 B1* | 5/2007 | Schlosser | ............... | G03B 21/56 |
| | | | | 160/219 |
| 2002/0024640 A1* | 2/2002 | Ioka | ....................... | G03B 21/13 |
| | | | | 353/94 |
| 2008/0088807 A1* | 4/2008 | Moon | ..................... | G09G 5/02 |
| | | | | 353/121 |
| 2009/0213335 A1* | 8/2009 | Kondo | .................... | G03B 37/04 |
| | | | | 353/30 |
| 2009/0262305 A1* | 10/2009 | Read | ........................ | E04H 3/22 |
| | | | | 352/40 |
| 2011/0169924 A1* | 7/2011 | Haisty | ................... | H04N 9/3147 |
| | | | | 348/51 |
| 2011/0228104 A1* | 9/2011 | Nelson | ................. | H04N 9/3147 |
| | | | | 348/190 |
| 2014/0016099 A1* | 1/2014 | Choi | .................. | G02B 27/2271 |
| | | | | 353/30 |
| 2015/0160540 A1* | 6/2015 | Kim | ..................... | G03B 21/147 |
| | | | | 353/69 |
| 2016/0127711 A1* | 5/2016 | Kim | ........................ | G06T 3/005 |
| | | | | 348/52 |
| 2016/0134862 A1* | 5/2016 | Kang | .................... | H04N 9/3147 |
| | | | | 348/52 |

FOREIGN PATENT DOCUMENTS

| | | | |
|---|---|---|---|
| JP | 2002350979 A | 12/2002 |
| JP | 2007-147786 A | 6/2007 |
| JP | 2007-536051 A | 12/2007 |
| KR | 20120084835 A | 7/2012 |
| KR | 101455662 A | 10/2014 |

* cited by examiner

S Effective area

S1  S2  S3  S4

| Site | Theater No. | Area of projection plane | Effective area ratio | Front margin symmetry | Effective seat ratio | Distortion area ratio | Rank |
|---|---|---|---|---|---|---|---|
| A | 2 | 131 | 0.94 | 0.99 | 0.87 | 0.06 | 1 |
| B | 13 | 186 | 0.84 | 0.95 | 0.83 | 0.09 | 2 |
| C | 3 | 171 | 0.77 | 0.8 | 0.84 | 0.1 | 3 |
|   |   | ⋮ |   |   |   |   |   |
| D | 8 | 192 | 0.69 | 0.79 | 0.80 | 0.21 | 28 |
| E | 5 | 145 | 0.67 | 0.79 | 0.81 | 0.20 | 29 |
|   |   | · |   |   |   |   |   |

Suitability ↑ / Unsuitability ↓

FIG. 9

| Class | Effective area area ratio | Error range of front side ratio | Front bezel ratio | Front bezel symmetry | Effective seat ratio | Distortion area ratio |
|---|---|---|---|---|---|---|
| 1 | 75% or more | less than 0.3 | less than 1.05 | less than 0.2 | 0.8 or more | less than 3% |
| 2 | 70% or more ~ less than 75% | 0.3 or more ~ less than 0.6 | 1.05 or more ~ less than 1.10 | 0.2 or more ~ less than 0.4 | 0.6 or more ~ less than 0.8 | 3% or more ~ less than 5% |
| 3 | 65% or more ~ less than 70% | 0.6 or more ~ less than 0.9 | 1.10 or more ~ less than 1.15 | 0.4 or more ~ less than 0.6 | 0.4 or more ~ less than 0.6 | 5% or more ~ less than 10% |
| 4 | 60% or more ~ less than 65% | 0.9 or more ~ less than 1.2 | 1.15 or more ~ less than 1.20 | 0.6 or more ~ less than 0.8 | 0.2 or more ~ less than 0.4 | 10% or more ~ less than 15% |
| 5 | less than 60% | 1.2 or more | 1.2 or more | 0.8 or more | less than 0.2 | 15% or more |

FIG. 10

| Item | Numerical value | Class |
|---|---|---|
| Effective area ratio | 73% | Second class |
| Error range of front side ratio | 1.66 | First class |
| Front bezel ratio | 1.02 | First class |
| Front bezel symmetry | 0.5 | Third class |
| Effective seat ratio | 0.9 | First class |
| Distortion area ratio | 8% | Third class |
| General class | | Third class |

(1) Theater width
(2) Theater height
(3) Theater depth
(4) Screen width
(5) Screen height
(6) Left bezel
(7) Right bezel
(8) Length from ceiling to top boundary of screen
(9) Length from bottom boundary of screen to bottom of theater
(10) Front depth of seat
(11) Rear depth of seat
(12) Rear height of seat

APPARATUS AND METHOD FOR DETERMINING CONTENT SCREENING SUITABILITIES IN A MULTI-PROJECTION THEATER

CROSS REFERENCE TO RELATED APPLICATION

The present application claims the benefit of Korean Patent Application No. 10-2014-0184949 filed in the Korean Intellectual Property Office on Dec. 19, 2014, the entire contents of which are incorporated herein by reference.

BACKGROUND OF THE INVENTION

1. Technical Field

The present invention relates to a method of determining content screening suitabilities in a multi-projection theater including a plurality of projection planes. More particularly, the present invention relates to a method of determining content screening suitabilities based on a series of operation equations using content attribute values, such as the horizontal length and vertical length of an output screen when content is played back, and theater attribute values, such as the length and height of the surface of a front or side wall within a theater building.

2. Description of the Related Art

As the culture content industry and movie industry are advanced, the type of movie content becomes various. Furthermore, facilities and environments for screening movies are improved and services provided by theaters are diversified.

In particular, in line with such a change of the market, unlike in the conventional screening of content based on a single screen within a theater, continuous research is carried out on a screening environment having a better feeling of immersion using a plurality of projection planes. As a result, a multi-projection theater further including auxiliary projection planes on both sides of a projection plane in addition to the projection plane at the front side has been commercialized.

In general, theaters constructed at places have different attribute values, such as the width or height of a screen. The height and width of the surface of a wall of a theater which may be used as an auxiliary projection plane are also different. There is a problem in that movie content is not properly screened if content is different depending on a screen within a theater or the surface of a wall of a theater although the movie content is screened.

For example, if a ratio of the width to height of a front screen included in a theater is only 1.85:1 although movie content has been fabricated in a specific screen ratio (2.35:1), the movie content may not be correctly output within the theater or may be screen in a reduced state.

There is a Korean Patent Application Publication No. 2012-0084835 as a prior art. The prior art discloses only contents in which a correlation between the height of a front screen and the height of a seat is taken into consideration, but does not disclose contents regarding content screening suitability in which the structural attribute values of a theater, such as the screen and the surface of a wall of the theater, are taken into consideration as in the present invention.

The present invention has been designed to construct an environment in which movie content can be correctly screened by taking into consideration the structural attribute values of a theater, such as a screen and the surface of a wall included in the theater, and has been invented to satisfy the aforementioned technical needs and to provide additional technical elements which may not be easily invented by those skilled in the art.

SUMMARY OF THE INVENTION

An object of the present invention is to define an environment in which content can be properly screened by taking into consideration the structural attribute values of a screen on which content is projected and a theater. That is, an object of the present invention is to calculate the screening suitability of content by taking into consideration the structural attribute values of a theater.

In an aspect of the present invention, a method of determining content screening suitabilities includes calculating at least one of a screen attribute value and a theater attribute value, calculating a suitability based on the screen attribute value or the theater attribute value, and determining whether the calculated suitability falls within a predetermined range.

Furthermore, in the method of determining content screening suitabilities, calculating at least one of the screen attribute value and the theater attribute value may include calculating a plurality of the screen attribute values and a plurality of the theater attribute values. Calculating the suitability may include calculating one or suitabilities based on the plurality of screen attribute values and the plurality of theater attribute values. Determining whether the calculated suitability falls within the predetermined range may include determining whether content is suitable for being screened according to each of the suitabilities by determining whether each of the suitabilities falls within a predetermined range.

In the method of determining content screening suitabilities, determining whether the calculated suitability falls within the predetermined range may include assigning a class corresponding to a predetermined range to a suitability if, as a result of the determination, each of the suitabilities is determined to fall within any one of a plurality of the predetermined ranges.

In the method of determining content screening suitabilities, the screen attribute value may include the width of a content output screen, the theater attribute value may include the width of a projection surface within the theater, and the suitability may include an effective area ratio calculated by Equation 1.

$$\frac{\text{Screen width value}}{\text{Projeciton surface width value}} = \text{Effective area ratio} \quad (1)$$

In this case, the content screening suitability may be determined to be satisfied if the effective area ratio is 0.7 or more to 1.0 or less.

In another method of determining content screening suitabilities, the screen attribute value may include the front traverse length and side traverse length of a content output screen, and the suitability may include a front side ratio (FSR) calculated by Equation 2.

$$\frac{\text{Side traverse length}}{\text{Front traverse length}} = FSR \quad (2)$$

In this case, the content screening suitability may be determined to be satisfied if the FSR is 1.75 or more to 2.25 or less.

Furthermore, in the method of determining content screening suitabilities, the screen attribute value may include the traverse length of a content output screen, the theater attribute value may include a traverse length of a projection plane within the theater, and the suitability may include a front offset ratio (FOR) calculated by Equation 3.

$$\frac{\text{Traverse length of projection plane}}{\text{Traverse length of screen}} = FOR \qquad (3)$$

Furthermore, in this case, the content screening suitability may be determined to be satisfied if the front offset ratio is 1.0 or more to 1.2 or less.

In another method of determining content screening suitabilities, the theater attribute value may include a left bezel and a right bezel, and the suitability may include a front symmetric ratio calculated by Equation 4.

$$\frac{|\text{Average bezel} - \text{left bezel}|}{\text{Average bezel}} = \qquad (4)$$

Front bezel symmetry (average bezel = 1/2 (left bezel + right bezel))

In yet another method of determining content screening suitabilities, the theater attribute value may include the number σ and a total number N of seats disposed in the height lower or higher than an image output range, and the suitability may include an effective seat ratio calculated by Equation 5.

$$\frac{1}{N}\sum_{i=1}^{N}\sigma_i = \text{Effective seat ratio} \qquad (5)$$

$$\begin{cases} \sigma_1 = 1, y_i \in [\text{bottom of image, top of image}] \\ \sigma_1 = 0, y_i \notin [\text{bottom of image, top of image}] \end{cases}$$

Furthermore, in the method of determining content screening suitabilities, the theater attribute value may include the area of one or more protrusions on a projection plane and the effective area of a projection plane on which a content image is projected, and the suitability may include a distortion area ratio calculated by Equation 6.

$$\frac{\text{Protrusion area}}{\text{Effective area}} = \text{Distortion area ratio} \qquad (6)$$

In another aspect of the present invention, an apparatus for determining content screening suitabilities in a multi-projection theater includes a data acquisition unit configured to calculate at least one of a screen attribute value and a theater attribute value and an operation unit configured to calculate the screening suitability of content based on at least one of the screen attribute value and the theater attribute value.

BRIEF DESCRIPTION OF THE DRAWINGS

FIGS. 9 and 10 illustrate a class reference table for content screening suitabilities and that classes are assigned to specific theaters based on the reference table.

DETAILED DESCRIPTION

Figure 1:
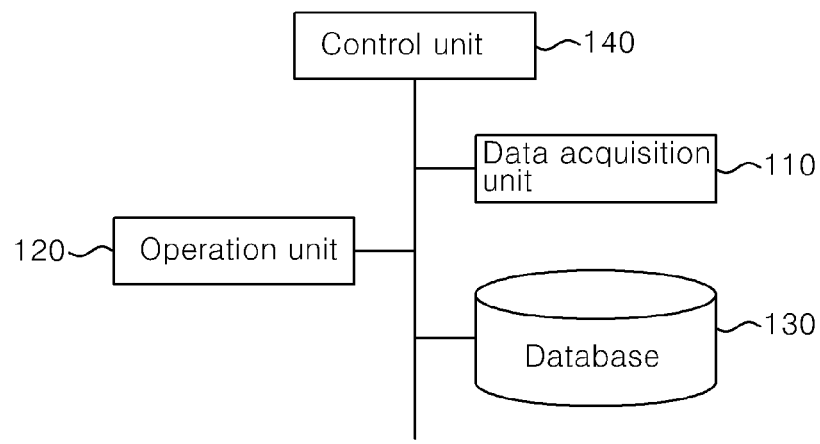
FIG. 1 is a block diagram showing the configuration of an apparatus for determining content screening suitabilities in accordance with an embodiment of the present invention.

The objects and technical configurations of the present invention and the details of corresponding acting effects will become more clearly understood from the following detailed description based on the drawings accompanied by the specification of the present invention. Hereinafter, embodiments of the present invention are described in detail with reference to the accompanying drawings.

Embodiments disclosed in this specification should not be interpreted or used as limiting the scope of the present invention. It is evident to those skilled in the art that a description including the embodiments of this specification may have various applications. Accordingly, some embodiments of the present invention described in the detailed description of the present invention are illustrative for a better description, and the scope of the present invention is not intended to be limited to the embodiments.

Functional blocks illustrated in the drawings and described below are only examples of possible implementations. In other implementations, different functional blocks may be used without departing from the spirit and scope of the detailed description. Furthermore, although one or more functional blocks of the present invention are illustrated as separate blocks, one or more of the functional blocks of the present invention may be a combination of various hardware and software elements executing the same function.

Furthermore, it should be understood that an expression that some elements are "included" is an expression of an "open type" and the expression simply denotes that the corresponding elements are present, but does not exclude additional elements.

Furthermore, when one element is described as being "connected" or "coupled" to the other element, it should be understood that one element may be directly connected or coupled to the other element, but a third element may be interposed between the two elements.

An apparatus for determining content screening suitabilities which is described in an embodiment of the present invention may be a server managed by a theater service operator.

Furthermore, content screening suitabilities may be content screening suitabilities which have been digitized regarding whether a piece of content can be properly output without a phenomenon in which an image is distorted and/or cut in a specific theater. The content screening suitabilities may include an effective area ratio, a front side ratio, a front offset ratio, a front symmetric ratio, an effective seat ratio, and a distortion area ratio.

Figure 11:
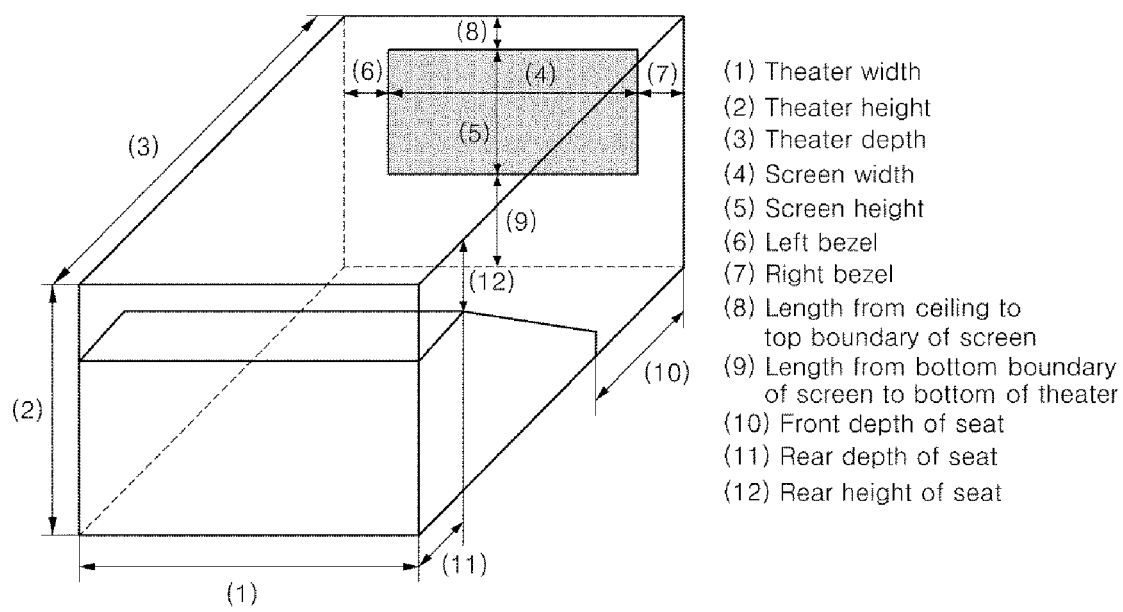
FIG. 11 is a diagram illustrating the parameters of a multi-projection theater that is the premise of the present invention.

Furthermore, the parameters of a theater or screen to which reference is made in describing embodiments of the present invention are described with reference to FIG. 11.

The apparatus for determining content screening suitabilities in accordance with an embodiment of the present invention is described in detail with reference to FIG. 1.

Referring to FIG. 1, the apparatus for determining content screening suitabilities basically includes a data acquisition unit 110 and an operation unit 120 and may further include a database 130.

The data acquisition unit 110 is an element configured to collect basis data necessary to calculate content screening suitability and functions to obtain at least one of screen attribute values and theater attribute values.

The screen attribute values mean various attribute values of an output screen when specific content is played back. The screen attribute values may include horizontal/vertical lengths, a width versus height ratio, brightness, a contrast ratio, and pixel information of a screen.

The theater attribute values refer to various attribute values of a theater, that is, a building. The theater attribute values may include the length of the surface of each wall of a theater which has been laterally measured, the height of a theater, and the width of the surface of each wall.

A method of collecting, by the data acquisition unit 110, screen attribute values or theater attribute values may include a method of directly receiving values from a user and a method of reading the attribute values of specific content or a specific theater from the external database 130 or data storage device.

The operation unit 120, that is, yet another element of the apparatus for determining content screening suitabilities, functions to calculate the screening suitabilities of specific content based on at least one of screen attribute values and theater attribute values collected by the data acquisition unit 110.

As described above, a content screening suitability is content screening suitability which has been digitized and by which whether a piece of content can be properly output in a specific theater may be determined. In this case, various indices may be used as the content screening suitabilities.

A process of calculating, by the operation unit 120, content screening suitabilities is described later with reference to FIGS. 2 to 4.

The apparatus for determining content screening suitabilities in accordance with an embodiment of the present invention may further include the database 130 in addition to the functional units.

The database 130 may store screen attribute values and theater attribute values which have been collected by the data acquisition unit 110 and matched up for each piece of content and each theater. The database 130 may also store content screening suitabilities calculated by the operation unit 120 for each theater.

Furthermore, the database 130 may provide the stored information to a user who accesses the database 130. In this case, the information may be listed according to the values of screening suitabilities of specific content for each theater so that a user may easily understand the information.

The apparatus for determining content screening suitabilities in accordance with another embodiment of the present invention may further include a control unit 140 configured to control the data acquisition unit 110, the operation unit 120, and the database 130.

The control unit 140 may include at least one operation device. The operation device may be a general-purpose central processing unit (CPU), a programmable device element (e.g., a CPLD or an FPGA) implemented for a specific purpose, an application-specific integrated circuit (ASIC), or a microcontroller chip.

A process of calculating content screening suitabilities is described in detail below with reference to FIGS. 2 to 4.

Figure 2:
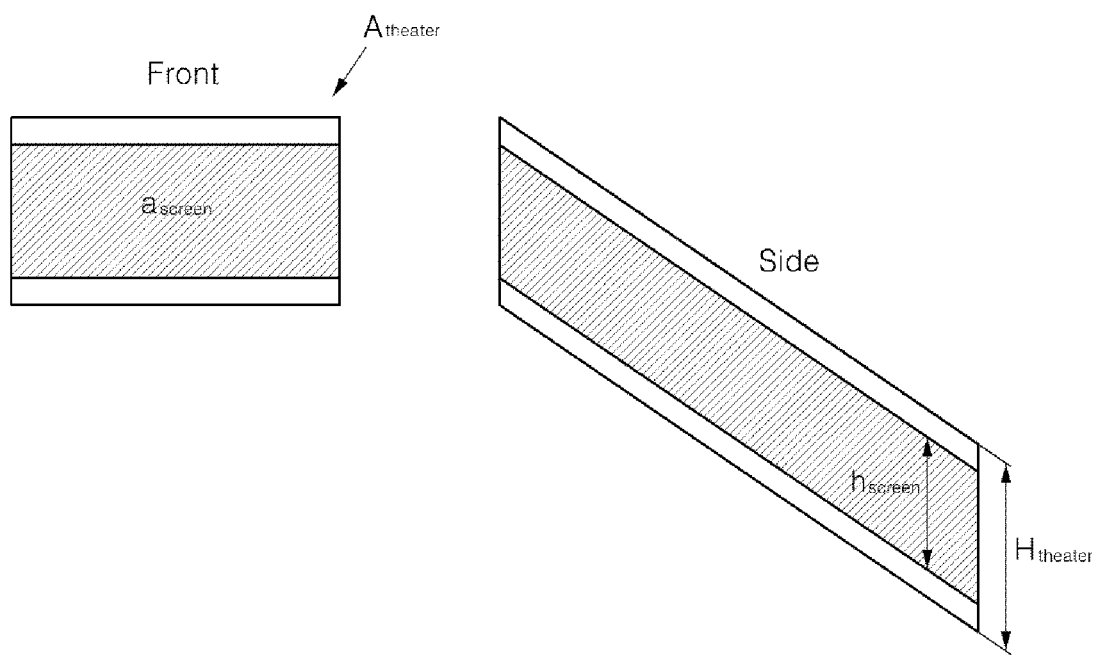
FIG. 2 shows screen attribute values and theater attribute values required to calculate an effective area ratio.

FIG. 2 illustrates an effective area ratio of the content screening suitabilities. An effective area ratio is a ratio of the width $A_{theater}$ of a projection plane within a theater to the width $a_{screen}$ of an output screen when content is played back. The effective area ratio is calculated using Equation 1 below.

$$\frac{\text{Screen width value}}{\text{Projection surface width value}} = \text{Effective area ratio} \quad (1)$$

The effective area ratio may be calculated with respect to all projection planes included in a theater. For example, an effective area ratio may be calculated with respect to each of a screen installed at the front side of a theater, side walls forming the sides of the theater, and a multi-plane in which the screen and the side walls are considered to be a single projection plane.

For example, assuming that a theater A has a front screen size of 21.2×11.5 m and an area of 243.8 m² and an output screen when content "a" is played back has a size of 17.5×10.05 m and an area of 75.88 m², an effective area ratio is 0.721.

In an embodiment of the present invention, if the horizontal length of a content image is the same as the horizontal length of a projection plane within a theater, an effective area ratio may be calculated by comparing the height of a content image $h_{screen}$ with the height of a projection plane $H_{theater}$.

For example, assuming that a theater A has a front screen standard of 21.2×11.5 m and an output screen when content "b" is played back has a size of 21.2×10.05 m, an effective area ratio in the theater A of the content "b" may be calculated by calculating a ratio of the height of the screen to the height of the image, that is, 10.05/11.5.

In general, a multi-projection theater includes a screen of a specific standard at the front side and is implemented so that an image at the front side maintains its vertical length and is extended on both sides, that is, in the horizontal direction, using the surfaces of walls as projection planes. Accordingly, if the effective area ratio of the front side and both sides of a multi-projection theater is to be calculated, the effective area ratio may be easily calculated by comparing the height of a screen included in the front side with the height of the theater as described above. Furthermore, if bezel spaces on the left and right of the front screen are neglected, the front side and the sides have the same effective area ratio. The values obtained as described above may be defined as the effective area ratio of the entire multi-projection theater.

$$\frac{\text{Screen height}}{\text{Theater height}} = \text{Effective area ratio}$$

Such a method has an advantage in that it can minimize and simplify an operation process because it is based on data which may be easily obtained through drawings or actual measurement.

In this operation process, an error can be offset by neglecting bezels on the left and right of the front screen and an error according to the calculation of an effective area ratio is taken into consideration when a front offset ratio to be described later is calculated.

The apparatus for determining content screening suitabilities in accordance with an embodiment of the present invention may calculate a digitized suitability and may also determine whether the content screening suitability is satisfied if the digitally calculated suitability falls within a specific number and provide corresponding information so that a user can separately recognize the satisfied content screening suitability. That is, if a calculated effective area ratio is 70% or more, the apparatus for determining content screening suitabilities may provide corresponding information so that customers determine that corresponding content has no problem in being screened on a corresponding theater, that is, determine that the corresponding content has a combination of content screening suitabilities.

Figure 3:
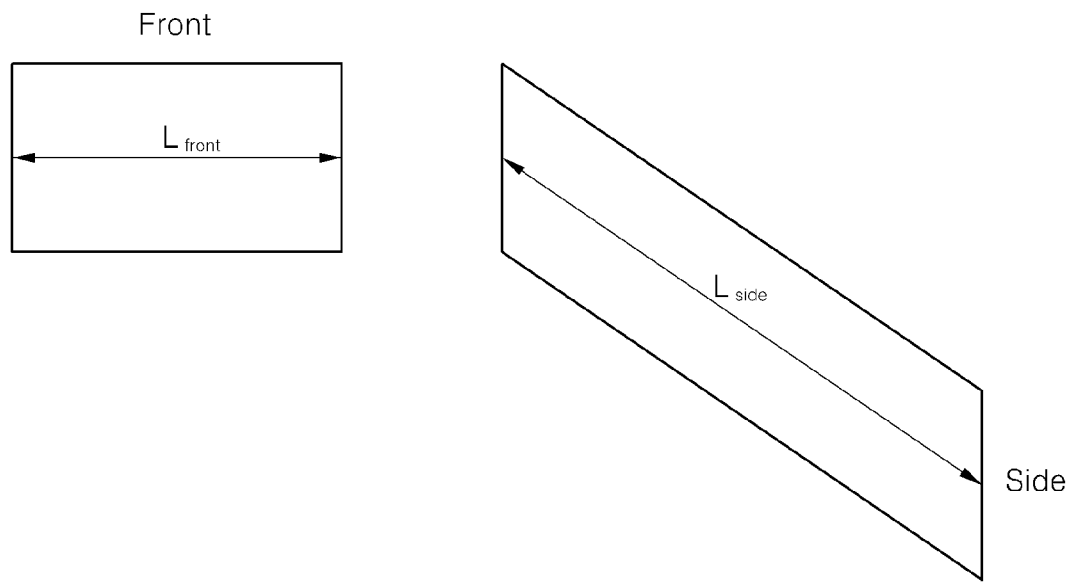
FIG. 3 shows screen attribute values required to calculate a front side ratio (FSR).

FIG. 3 illustrates an FSR of the content screening suitabilities. The FSR refers to a ratio of the side traverse length $L_{side}$ of an output screen when content is played back to the front traverse length $L_{front}$ of an image. The FSR may be calculated using Equation 2 below.

$$\frac{\text{Side traverse length}}{\text{Front traverse length}} = FSR \quad (2)$$

As may be seen from Equation 2, the FSR is based up the premise that an image when content is played back is output to both a projection plane at the front side of a theater and projection planes on the sides of the theater. The FSR refers to a ratio of the amount of content information output to the projection plane of the front side to the amount of content information output to the projection planes on the sides.

In a detailed embodiment, assuming that an image output when content is played back includes images output to a total of three projection planes, including an image output to the front side and images output to the left and right sides, if the traverse length of the image output to the front side is 15 m and the traverse length of each of the images output to the left and right sides is 28 m, an FSR value is 1.87 based on 28/15 according to Equation 2.

Furthermore, in the case of a common multi-projection theater, Equation 2 may be represented as follows using data which may be easily obtained through figures or actual measurement, for example, the horizontal length of a screen or the depth of the theater.

$$\frac{\text{Theater depth}}{\text{Screen width}} = FSR$$

The apparatus for determining content screening suitabilities in accordance with an embodiment of the present invention may determine that a content screening suitability has been satisfied if an FSR falls within a specific numerical range.

Specifically, the FSR is not a factor which has a direct effect on a sense of immersion, but has an effect on a multi-projection screening suitability in that it is related to a ratio of content that is played back. For example, assuming that a ratio of an image at the front side of content to be played back in a multi-projection theater to an image on the side of the multi-projection theater is smaller than an FSR unique to the theater, if the content is played back at a constant ratio in the multi-projection theater, there is a problem in that all effective areas are not filled. Furthermore, if a bezel that belongs to the areas of the surfaces of walls and on which an image is not projected comes into sight of customers, this becomes as a fatal factor which deteriorates a sense of immersion of customers. In order to solve such problems, a bezel within the surfaces of the walls may be reduced if a ratio of an image is neglected and the image is expanded left and right, but a ratio of an image is not suitable. This becomes a factor which is contrary to the production intention of a content producer.

Accordingly, content may be played back most suitably in a theater having a ratio similar to the standard of the content, and such a screening suitability may be determined based on an error range between the FSR of the content and the FSR of the theater.

In this case, it is difficult to determine a standard numerical value which may be used to calculate a screening suitability because the FSR of content is different depending on the content. If an FSR according to the structure of a theater having the most common type or a theater having average numerical values in structure is assumed to be a standard and content is produced based on the standard, an error range attributable to a theater can be minimized. In accordance with the results of analysis of a standard normal distribution based on the figures of the structures of nationwide theaters, it was found that an FSR value of 1.85 is the most closest to the standard. Accordingly, 1.85 may be determined to be the standard FSR of content for a multi-projection theater, and a screening suitability is assumed to be 1.85 in the detailed description.

The screening suitability may be determined through an error range based on the standard. For example, if an error range is 0.2, it means that the FSR value of a corresponding theater falls between 1.65 and 2.05. If the error range is reduced, it means that content produced based on the standard may be properly screened in a corresponding theater.

Figure 4:
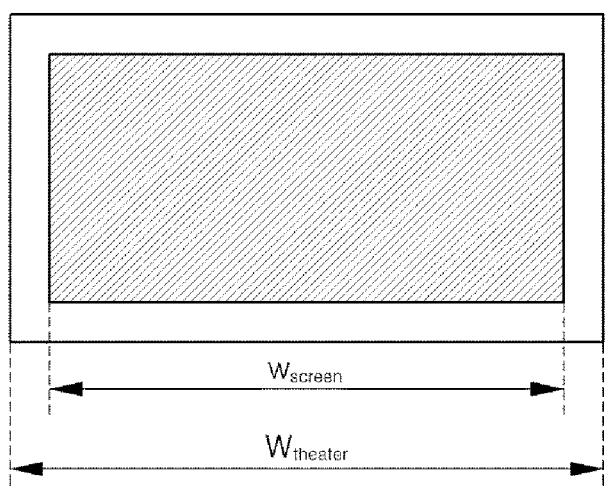
FIG. 4 shows screen attribute values and theater attribute values required to calculate a front offset ratio.

FIG. 4 illustrates a front offset ratio (FOR) of the content screening suitabilities. A bezel means a projection plane outside an image area when content is played back. If the area of the bezel is reduced, there is an advantage in that customers may further focus their attentions on a content image. The FOR is an index indicating that how much is bezel present outside an image area and may be calculated using Equation 3 below.

$$\frac{\text{Traverse length of projection plane}}{\text{Traverse length of screen}} = FOR \quad (3)$$

In accordance with FIG. 4 and Equation 3, the FOR may be calculated by dividing the traverse length $W_{theater}$ of a projection plane within a theater by the traverse length $w_{screen}$ of an output screen when content is played back.

For example, if the traverse length $w_{screen}$ of an image is 15 m and the traverse length $W_{theater}$ of a projection plane is 18 m, an FOR is 1.2.

Furthermore, in the case of a common multi-projection theater, Equation 3 may be represented as follows using data which may be easily obtained through figures or actual measurement, for example, the horizontal length of a theater (i.e., the width of the theater) or the horizontal length of an image (i.e., the width of an image).

$$\frac{\text{Theater width}}{\text{Screen width}} = FOR$$

As may be seen from Equation 3 or the analysis of the above equation, as the FOR becomes close to 1, a sense of difference between a content image and a projection plane is reduced and a realistic feeling of immersion can be provided to customers.

As described above, the apparatus for determining content screening suitabilities in accordance with an embodiment of the present invention may determine that a content screening suitability has been satisfied if an FOR falls within a specific range and may determine that the screening suitability has been satisfied if the FOR is within a range of 1.0 to 1.2.

Figure 5:
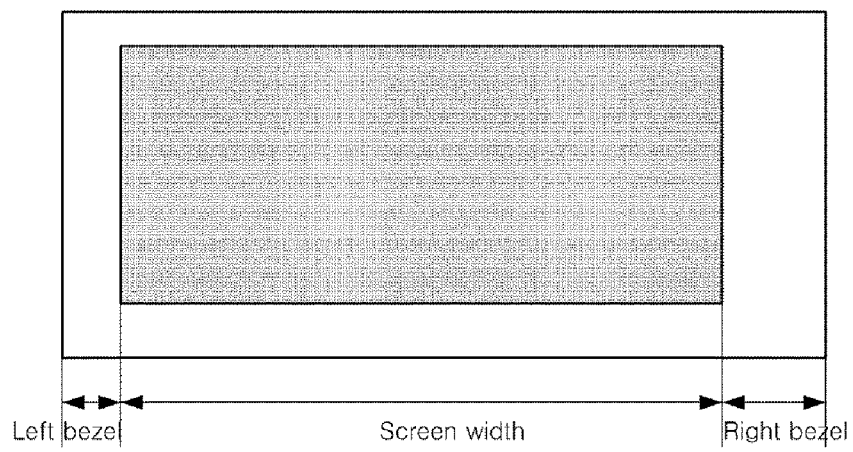
FIG. 5 shows theater attribute values required to calculate a front symmetric ratio.

FIG. 5 illustrates a front symmetric ratio of the content screening suitabilities. In this specification, a bezel refers to an area that belongs to a screen included in the surface of a wall at the front side of a theater and that is left behind without filling the entire surface of the wall. From FIG. 5, it may be seen that there is an area not filled with a screen if the area of the screen is narrower than the entire area of the surface of a wall.

There are many cases where a bezel is inevitably formed in the surface of a wall in implementing a multi-projection theater. In this case, it is known that when bezel areas on the left and right sides of a screen are symmetrical, this is positive for the watching of users.

The front symmetric ratio is an index by which whether bezels on the left and rights of a screen are symmetrical if the screen is included in the surface of a wall. The front symmetric ratio may be calculated using Equation 4 below.

$$\frac{|\text{Average bezel} - \text{left bezel}|}{\text{Average bezel}} = \qquad (4)$$

Front bezel symmetry (average bezel = 1/2(left bezel + right bezel))

In Equation 4, although the left bezel is substituted with the right bezel, the front symmetric ratio may be obtained.

In this case, the average bezel is (the left bezel+the right bezel)/2. In this case, the left bezel and the right bezel may be understood to be the length from a left edge at the front side of a theater to the boundary of the left of a screen and the length from a right edge at the front side of the theater to the boundary of the right of the screen, respectively, but are not limited to the horizontal lengths of the respective bezels. The left bezel and the right bezel may also be calculated based on the areas of the respective bezels.

A result of the calculation of Equation 4 is a value between 0 and 1. If the value is 0, it means that the bezels on the left and right sides of a screen are fully symmetrical. If the value becomes close to 0, it means that content is suitable for being screened in a corresponding theater.

Figure 6:
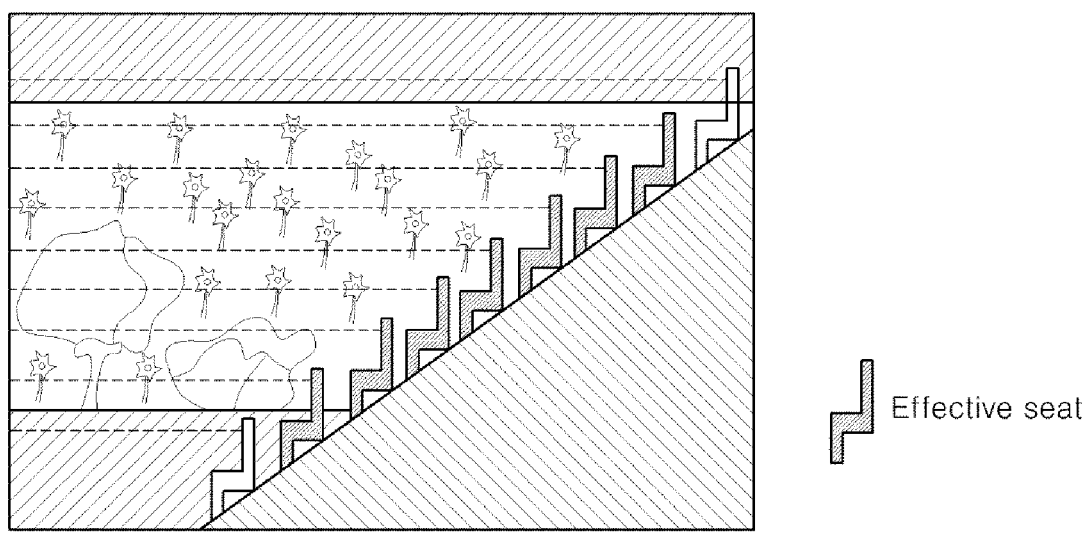
FIG. 6 is a diagram illustrating an effective seat and an effective seat ratio.

FIG. 6 illustrates an effective seat ratio of the content screening suitabilities. An effective seat may be understood to be a seat in which a customer may watch an image without an obstacle to his or her view when content is played back, that is, a seat in which a customer's view may be disposed in an image output range.

That is, referring to FIG. 6, if a plurality of seats is present in a theater, the views of customers who have been seated in their seats are indicated by horizontal dotted lines, and the bottom of an image and the top of the image are indicated by horizontal solid lines. If a customer's view, that is, a horizontal dotted line, is present between the horizontal solid lines, it means that a corresponding customer may effectively watch an image and other customers may not normally watch the image. Furthermore, a seat in which a customer may effectively watch an image and a seat in which a customer may not effectively watch the image are respectively indicated by an effective seat and an ineffective seat.

If multi-projection content is screened, customers may feel surrounded within an image when their views are included in the image section, thereby maximizing a sense of immersion. A seat in which a customer's view may be included in an image section as described above is inevitably deployed in a theater, and thus it is necessary to calculate the effective seat ratio. In particular, in the case of some theaters, the deployment of seats may be different depending on the step (or slope) and other structures or forms of the seats. For this reason, it is difficult o deploy all seats within an image section.

That is, the effective seat ratio is an index by which whether content is suitable for being screened in a corresponding theater if a ratio of effective seats of all of seats within the theater reaches a specific range. The effective seat ratio may be calculated using Equation 5 below.

$$\frac{1}{N}\sum_{i=1}^{N} \sigma_i = \text{Effective seat ratio} \qquad (5)$$

$$\begin{cases} \sigma_i = 1, \ y_i \in [\text{bottom of image, top of image}] \\ \sigma_i = 0, \ y_i \notin [\text{bottom of image, top of image}] \end{cases}$$

In Equation 5, $y_i$ denotes a customer view coordinate. If the view of a customer is placed at the location where the customer may effectively view an image, that is, the height of a customer view coordinate is between the bottom of the image and the top of the image, $\sigma_i$ has a value of 1. In contrast, if the view of a customer is placed at the location where the customer may not effectively view an image, that is, the height of a customer view coordinate is not between the bottom of the image and the top of the image, $\sigma_i$ has a value of 0.

The effective seat ratio calculated using Equation 5 has a value between 0 and 1. In this case, the apparatus for determining content screening suitabilities may determine that a screening suitability has been satisfied if an effective seat ratio falls within a specific numerical range and may determine that the screening suitability has been satisfied if an effective seat ratio falls within a range of 0.8 to 1.0.

Figures 7, 8:
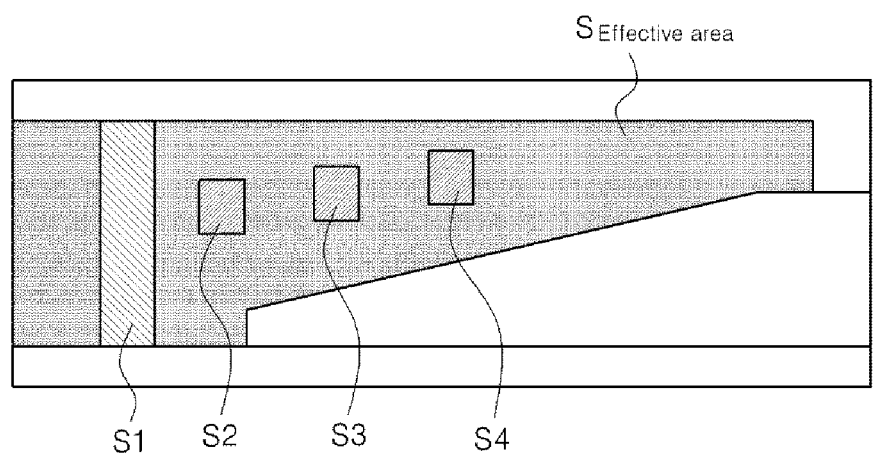
FIG. 7 shows theater attribute values required to calculate a distortion area ratio.
FIG. 8 shows an example in which a rank has been assigned to a plurality of theaters based on an effective area ratio.

FIG. 7 illustrates a distortion area ratio of the content screening suitabilities.

A distortion area refers to an area occupied by obstacles which hinder the normal projection of an image on a projection plane. In general, when a multi-projection theater is implemented, the surface of a wall is used as a projection plane. In this case, protrusions, such as posts, speakers, and/or other interiors, are present in the surface of a wall. Such protrusions become causes for which an image is not correctly projected and is distorted and projected. The distorted images become factors which prevent customers from being immersed in content.

Accordingly, in determining content screening suitabilities, reference may be made to a ratio of a distorted area in which an image may be distorted, that is, a distortion area ratio. The distortion area ratio may be calculated using Equation 6 below.

$$\frac{\text{Protrusion area}}{\text{Effective area}} = \text{Distortion area ratio} \quad (6)$$

In Equation 6, the protrusion area means the sum of areas occupied by various protrusions on a projection plane which are present on the projection plane. In contrast, an effective area means an area that belongs to a projection plane and on which an image may be projected.

Referring to FIG. 7, assuming that S1 is an area in which a post has been protruded and S2 to S4 are areas in which speakers provided in the surface of a wall have been installed, a distortion area ratio of a corresponding theater may be calculated as follows.

$$\frac{S1 + S2 + S3 + S4}{S_{effective\ area}} = \text{Distortion area ratio}$$

An embodiment in which the content screening suitabilities calculated through the aforementioned processes are used is described below with reference to FIG. 8.

The apparatus for determining content screening suitabilities may allow a user who tries to produce content or a user who tries to distribute produced content to each theater to access the database 130 and provide information to the user so that the user checks the content screening suitabilities as in a table of FIG. 8.

FIG. 8 shows an example in which a rank has been assigned to a plurality of theaters based on an effective area ratio. An effective area ratio calculated according to FIG. 2 and Equation 1 may be matched up with theaters and the attribute values of the respective theaters and may be stored in the database 130 in the form of a table, such as FIG. 8.

From FIG. 8, it may be seen that the theater No. 2 of a theater A, the theater No. 13 of a theater B, and the theater No. 3 of a theater C have respective effective area ratios of 0.94, 0.84, and 0.77. All of the effective area ratios are higher than 0.7, that is, a criterion by which whether content screening suitabilities are satisfied. It may be seen that corresponding content may provide high-quality screening service to customers if the content is played back in the theaters A, B, and C.

In contrast, it may be seen that the theater No. 8 of a theater D and the theater No. 5 of a theater E have effective area ratios of 0.69 and 0.67 and do not satisfy content screening suitabilities of 0.7 or more.

In accordance with an embodiment of the present invention, calculated content screening suitabilities may be stored in the database 130 as described above and provided to a user who requires corresponding information.

Another embodiment in which the content screening suitabilities calculated through the aforementioned process is used is described below with reference to FIGS. 9 and 10.

As may be seen from FIGS. 9 and 10, the calculated content screening suitabilities may be used to determine a class for each theater.

FIG. 9 shows class marks regarding that which class may be assigned if a content screening suitability falls within which range. If an effective area ratio is 75% or more, a first class is assigned to a corresponding theater. If an effective area ratio is less than 60%, a fifth class is assigned to a corresponding theater. Even in other suitability items, classes are assigned as described above.

FIG. 10 is an example showing that a class is assigned to a specific theater based on each of content screening suitabilities and a general class has been finally determined.

For example, assuming that content screening suitabilities have been calculated, such as that a theater A has an effective area ratio of 73%, an FSR of 1.66, and a front offset ratio of 1.02, a class is assigned to a screening suitability based on Table of FIG. 9(a). For example, a second class may be assigned to an effective area ratio of 73%, a first class may be assigned to an FSR of 1.66, and a first class may be assigned to a front offset ratio of 1.02.

A general class may be assigned to the theater A based on the classes assigned respective content screening suitabilities. This may be performed in various ways. For example, the general class may be set as the lowest class of classes corresponding to respective content screening suitabilities, or a value obtained by calculating an average value of classes corresponding to respective content screening suitabilities may be set as a general class.

In accordance with an embodiment of the present invention, there is an advantage in that a theater in which content can be viewed as optimized output content can be determined because a content screening suitability in which the structural attribute values of a theater and the screen attribute values of content have been taken into consideration is calculated and calculated data is managed.

Furthermore, in accordance with an embodiment of the present invention, there is an advantage in that a theater having a high screening suitability can be rapidly searched for based on the screen attribute values of content.

Although some embodiments and applications of the present invention have been illustrated and described above, the present invention is not limited to the aforementioned specific embodiments and applications, and those skilled in the art to which the present invention pertains may modify the present invention in various ways without departing from the gist of the present invention written in the claims. Such modified embodiments should not be interpreted as being distinct from the technical spirit or prospect of the present invention.

What is claimed is:

1. A method for determining content screening suitabilities in a multi-projection theater, the method comprising:
    calculating at least one of a screen attribute value and a theater attribute value;
    calculating a suitability based on the screen attribute value or the theater attribute value; and
    determining whether the calculated suitability falls within predetermined ranges,
    wherein the screen attribute value is a value representing either length or area related to a content output screen, and the theater attribute value is a value representing either length or area related to a projection surface within the theater, or a number of seats in the theater,
    wherein the calculated suitability is a ratio obtained using the screen attribute value or the theater attribute value, and
    wherein a content is screened in the multi-projection theater based on the determination that the calculated suitability falls within the predetermined ranges.

2. The method of claim 1, wherein:
    said calculating at least one of the screen attribute value and the theater attribute value comprises calculating a plurality of the screen attribute values and a plurality of the theater attribute values, said calculating the suitability comprises calculating suitabilities based on the plurality of screen attribute values and the plurality of theater attribute values, and
said determining whether the calculated suitability falls within the predetermined ranges comprises determining whether content is suitable for being screened according to each of the suitabilities by determining whether each of the suitabilities falls within a predetermined range among the predetermined ranges.

3. The method of claim 1, wherein determining whether the calculated suitability falls within the predetermined ranges comprises
assigning a class corresponding to a predetermined range to the calculated suitability when the calculated suitability is determined to fall within the predetermined range among the predetermined ranges.

4. The method of claim 1, wherein:
the screen attribute value comprises a width of a content output screen,
the theater attribute value comprises a width of a projection surface within the theater, and
the calculated suitability comprises an effective area ratio calculated by Equation (1) as follows:

$$\frac{\text{Screen width value}}{\text{Projection surface width value}} = \text{Effective area ratio.} \quad (1)$$

5. The method of claim 4, wherein the calculated suitability is determined to be satisfied if the effective area ratio is 0.7 or more to 1.0 or less.

6. The method of claim 1, wherein:
the screen attribute value comprises a front traverse length and side traverse length of a content output screen, and
the calculated suitability comprises a front side ratio (FSR) calculated by Equation (2) as follows:

$$\frac{\text{Side traverse length}}{\text{Front traverse length}} = FSR. \quad (2)$$

7. The method of claim 6, wherein the calculated suitability is determined to be satisfied if the FSR is 1.75 or more to 2.25 or less.

8. The method of claim 1, wherein:
the screen attribute value comprises a traverse length of a content output screen,
the theater attribute value comprises a traverse length of a projection plane within the theater, and
the calculated suitability comprises a front offset ratio (FOR) calculated by Equation (3) as follows:

$$\frac{\text{Traverse length of projection plane}}{\text{Traverse length of screen}} = FOR. \quad (3)$$

9. The method of claim 8, wherein the calculated suitability is determined to be satisfied if the front offset ratio is 1.0 or more to 1.2 or less.

10. The method of claim 1, wherein:
the theater attribute value comprises a left bezel and a right bezel, and
the calculated suitability comprises a front symmetric ratio calculated by Equation (4) as follows:

$$\frac{|\text{Average bezel} - \text{left bezel}|}{\text{Average bezel}} = \quad (4)$$

$$\text{Front bezel symmetry}\left(\text{average bezel} = \frac{1}{2}(\text{left bezel} + \text{right bezel})\right).$$

11. The method of claim 1, wherein:
the theater attribute value comprises a number σ and a total number N of seats disposed in a height lower or higher than an image output range, and
the calculated suitability comprises an effective seat ratio calculated by Equation (5) as follows:

$$\frac{1}{N}\sum_{i=1}^{N} \sigma_i = \text{Effective seat ratio} \quad (5)$$

$$\begin{cases} \sigma_1 = 1, y_i \in [\text{bottom of image, top of image}] \\ \sigma_i = 0, y_i \notin [\text{bottom of image, top of image}] \end{cases}.$$

12. The method of claim 1, wherein:
the theater attribute value comprises an area of one or more protrusions on a projection plane and an effective area of a projection plane on which a content image is projected, and
the suitability comprises a distortion area ratio calculated by Equation (6) as follows:

$$\frac{\text{Protrusion area}}{\text{Effective area}} = \text{Distortion area ratio.} \quad (6)$$

13. An apparatus for determining content screening suitabilities in a multi-projection theater, comprising:
a control unit configured to
calculate at least one of a screen attribute value and a theater attribute value,
calculate a screening suitability of a content based on at least one of the screen attribute value and the theater attribute value, and
determine whether the calculated screening suitability falls within a predetermined range,
wherein the screen attribute value is a value representing either length or area related to a content output screen, and the theater attribute value is a value representing either length or area related to a projection surface within the theater, or a number of seats in the theater,
wherein the calculated screening suitability is a ratio obtained using the screen attribute value or the theater attribute value, and
wherein the content is screened in the multi-projection theater based on the determination that the calculated screening suitability falls within the predetermined range.

* * * * *